(12) United States Patent
Nieuwstraten

(10) Patent No.: US 9,227,829 B2
(45) Date of Patent: Jan. 5, 2016

(54) FUEL STATION AND METHOD

(75) Inventor: Jan Hendrik Nieuwstraten, Rotterdam (NL)

(73) Assignee: Shell Oil Company, Houston, TX (US)

( * ) Notice: Subject to any disclaimer, the term of this patent is extended or adjusted under 35 U.S.C. 154(b) by 337 days.

(21) Appl. No.: 13/821,514

(22) PCT Filed: Sep. 9, 2011

(86) PCT No.: PCT/EP2011/065666
§ 371 (c)(1),
(2), (4) Date: May 23, 2013

(87) PCT Pub. No.: WO2012/032166
PCT Pub. Date: Mar. 15, 2012

(65) Prior Publication Data
US 2013/0299042 A1 Nov. 14, 2013

(30) Foreign Application Priority Data
Sep. 9, 2010 (EP) .................................... 10175932

(51) Int. Cl.
*B60S 5/02* (2006.01)
*B67D 7/04* (2010.01)
*B67D 7/58* (2010.01)

(52) U.S. Cl.
CPC ... *B67D 7/04* (2013.01); *B60S 5/02* (2013.01); *B67D 7/58* (2013.01)

(58) Field of Classification Search
CPC .............. B67D 7/04; B67D 7/06; B67D 7/58; B60S 5/02
USPC ........................................ 141/98; 137/234.6
See application file for complete search history.

(56) References Cited

U.S. PATENT DOCUMENTS

| | | | |
|---|---|---|---|
| 3,995,769 A | 12/1976 | Kuwabara et al. | 222/26 |
| 6,651,706 B2 * | 11/2003 | Litt | 141/234 |
| 6,786,250 B2 * | 9/2004 | Stanley | 141/98 |
| 8,176,931 B1 * | 5/2012 | Cajiga et al. | 137/234.6 |
| 8,573,242 B2 * | 11/2013 | Cajiga et al. | 137/15.01 |
| 8,667,690 B2 * | 3/2014 | Cajiga et al. | 29/897.3 |
| 8,959,774 B2 * | 2/2015 | Cajiga et al. | 29/897.3 |
| 8,991,447 B1 * | 3/2015 | Petersen | 141/387 |
| 2001/0037839 A1 * | 11/2001 | Litt | 141/234 |
| 2004/0073525 A1 * | 4/2004 | Stanley | 705/413 |
| 2006/0237092 A1 | 10/2006 | Webb | 141/98 |
| 2012/0317777 A1 * | 12/2012 | Cajiga et al. | 29/428 |
| 2012/0318406 A1 * | 12/2012 | Cajiga et al. | 141/98 |
| 2013/0175201 A1 * | 7/2013 | Cajiga et al. | 208/46 |

(Continued)

FOREIGN PATENT DOCUMENTS

| | | |
|---|---|---|
| CN | 101790489 A | 7/2010 |
| GB | 2383992 A | 7/2003 |

(Continued)

*Primary Examiner* — Nicolas A Arnett

(57) ABSTRACT

A fuel station and a method of refueling a vehicle. The fuel station has at least two adjacent base structures, each base structure being provided with a first fuel dispensing device arranged on the base structure and defining a first refueling position on a first side of the base structure, and a second refueling position on a second side of the base structure, the second side being opposite to the first side. A second fuel dispensing device defines a third refueling position. The fuel station also includes at least one queuing position in front of one of the base structures. The queuing position is linked to the refueling positions.

15 Claims, 16 Drawing Sheets

(56) References Cited

U.S. PATENT DOCUMENTS

| | | | |
|---|---|---|---|
| 2014/0123467 A1* | 5/2014 | Cajiga et al. | 29/469 |
| 2014/0305537 A1* | 10/2014 | Lian | 141/1 |
| 2015/0013839 A1* | 1/2015 | Cajiga et al. | 141/94 |
| 2015/0013840 A1* | 1/2015 | Cajiga et al. | 141/94 |

FOREIGN PATENT DOCUMENTS

| | | | |
|---|---|---|---|
| JP | 2004203474 A | 7/2004 | |
| JP | 2007224763 A | 9/2007 | |
| NL | 1035730 | 5/2009 | B67D 7/06 |
| WO | WO 98/45820 | 10/1998 | G07F 13/02 |

* cited by examiner

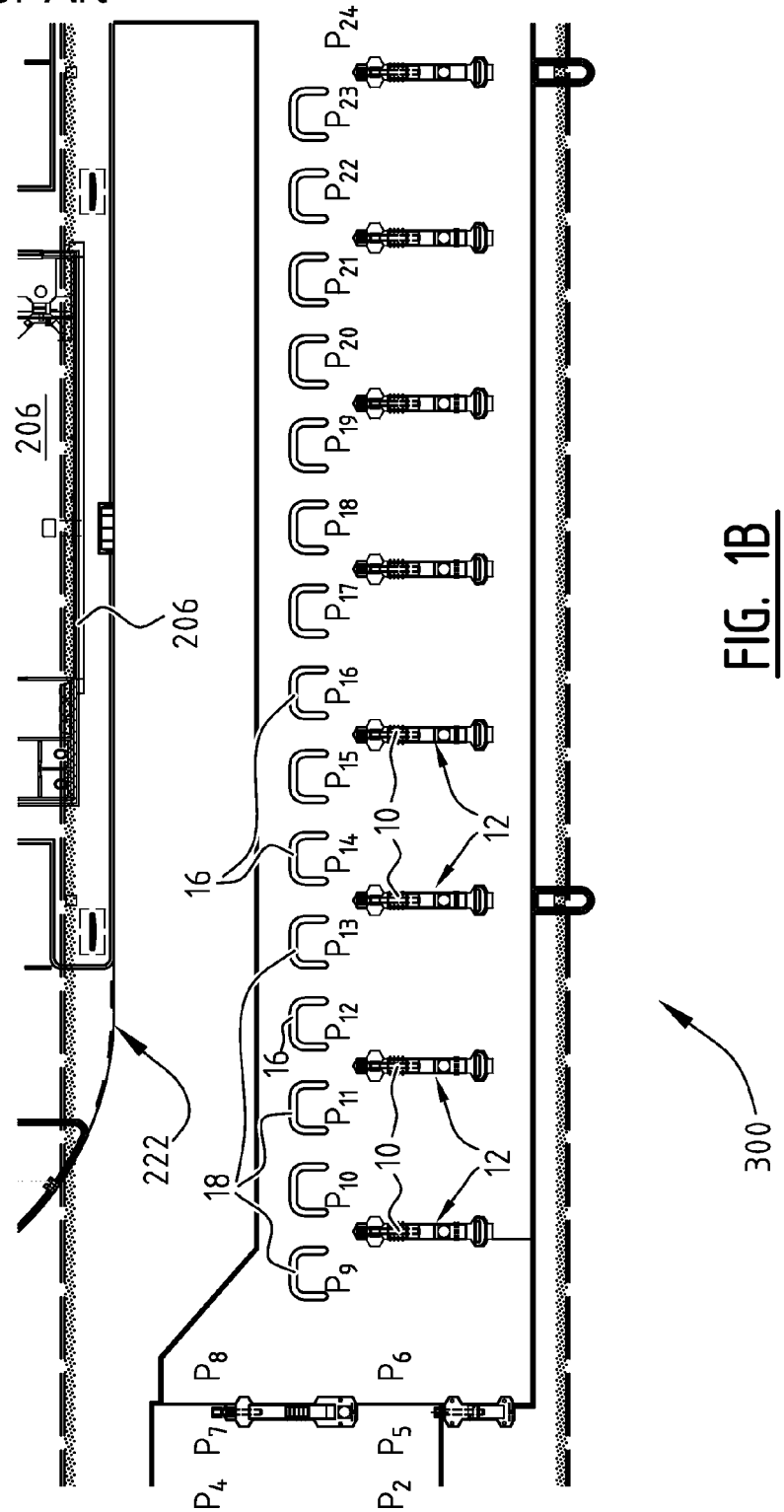

Fig. 1C

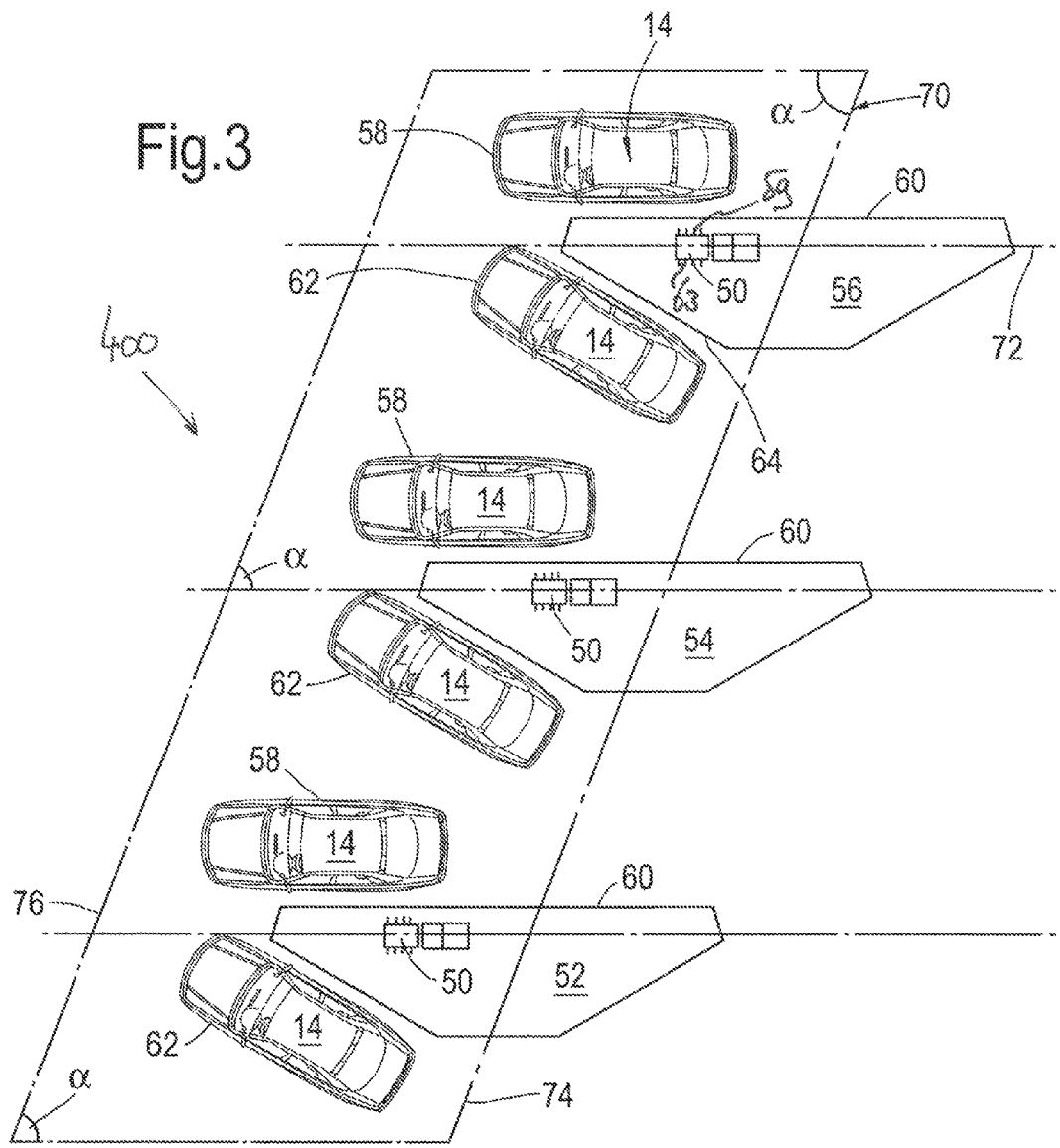

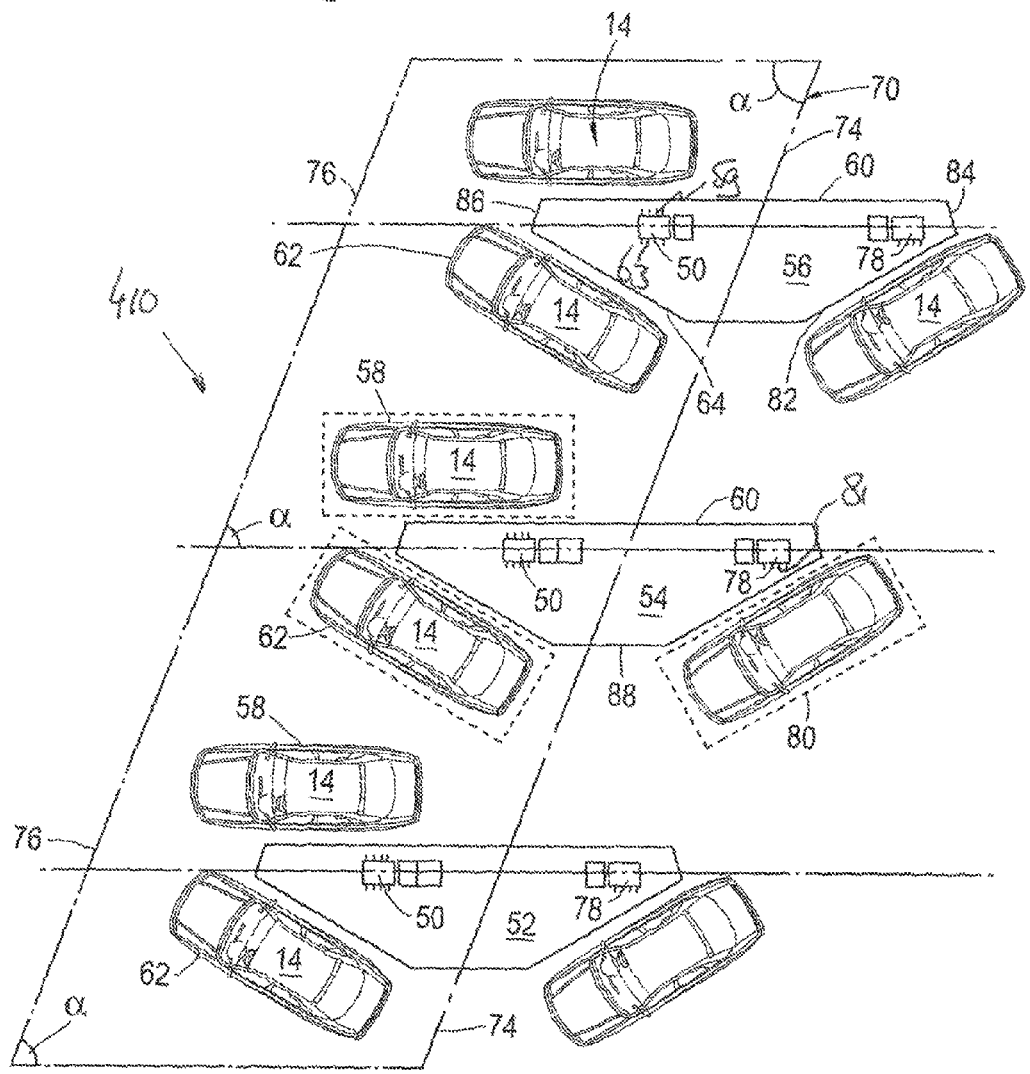

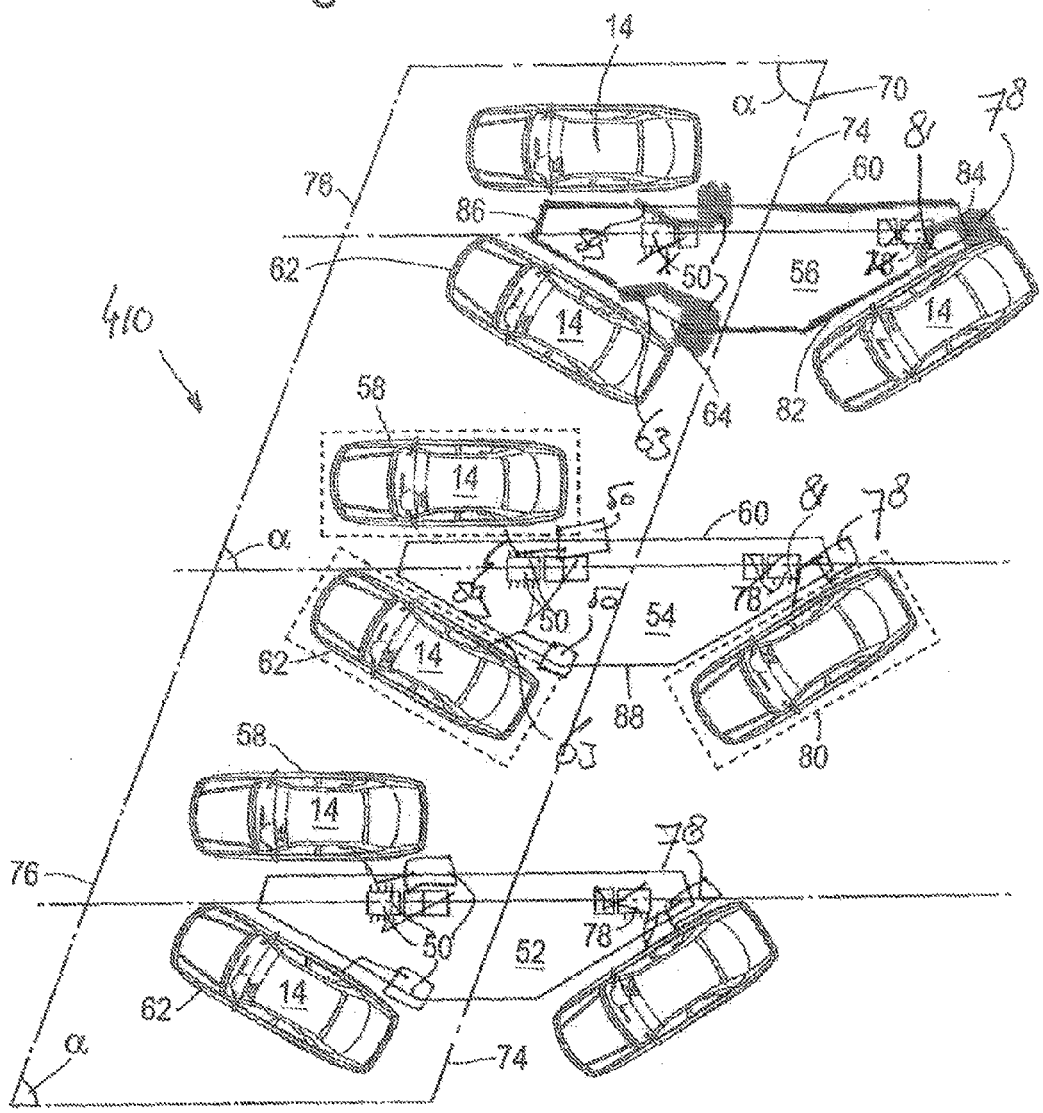

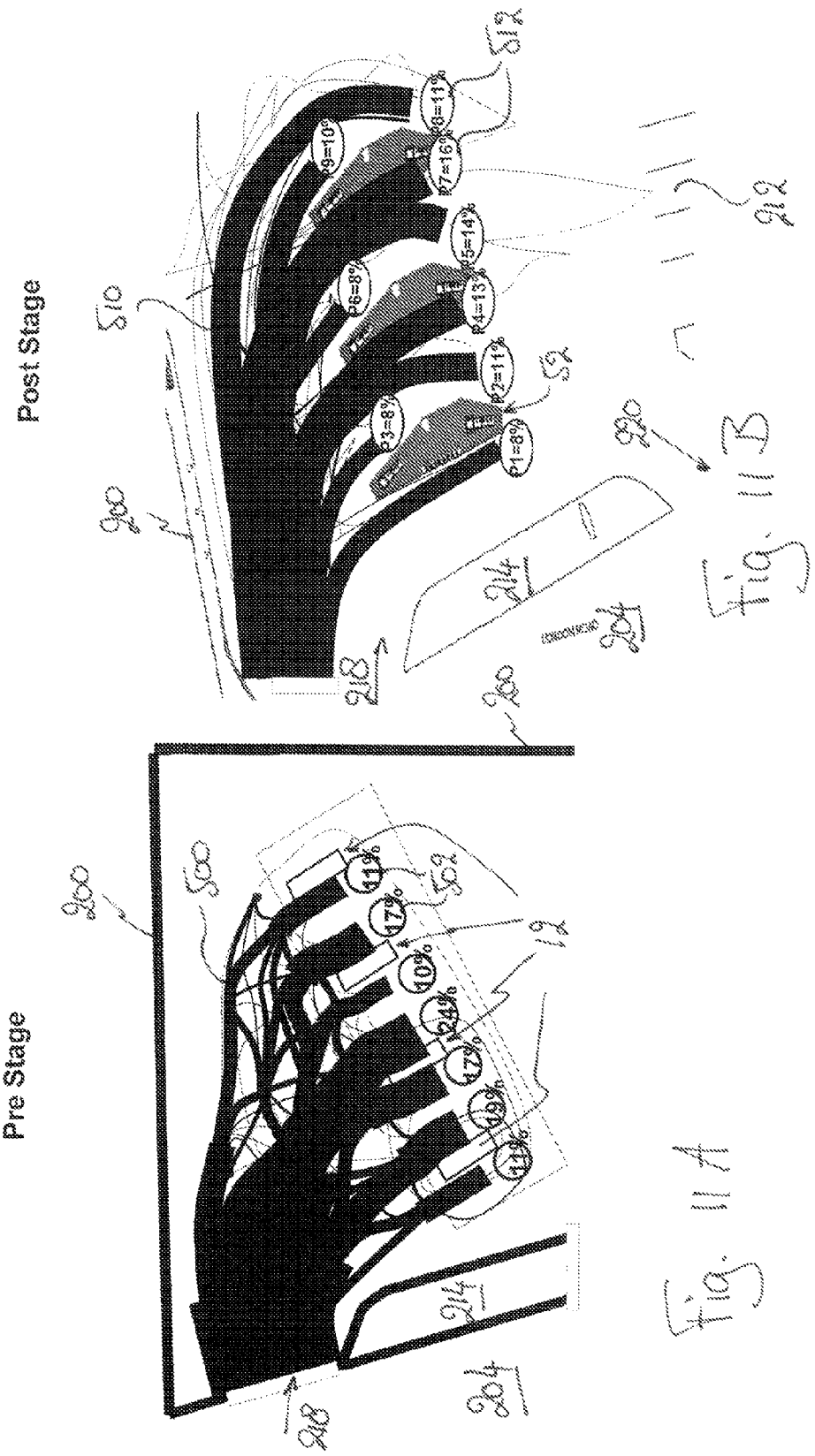

FUEL STATION AND METHOD

CROSS-REFERENCE TO RELATED APPLICATIONS

The present application is the National Stage (§371) of International Application No. PCT/EP2011/065666, filed Sep. 9, 2011, which claims priority from European Patent Application No. 10175932.2, filed Sep. 9, 2010, the disclosures of which are hereby incorporated by reference.

BACKGROUND OF THE INVENTION

The present invention relates to a fuel station and to a method for refueling vehicles, such as cars, bikes, vans and trucks.

In a typical fuel station, such as for instance shown in FIG. 1A, post- or column-like fuel dispensers or pump housings 10 are mounted on elongated islands 12. Each island is provided on the ground surface of the station to guard the dispensers or pumps from a possible accident due to a contact or collision of a vehicle 14 therewith and to guide vehicles entering in the station to refueling positions 16, 18. In general, each island is constructed with concrete in the shape of an elongated platform, so that the dispensing device can be mounted upright thereon and an operator may ride thereon so as not to prevent any passageway for the vehicles. Each dispensing device 10 typically defines two refueling positions 16, 18, one on each side of the corresponding island. A rectangular canopy 20 may be provided to cover the refueling positions and protect drivers, for instance against rain or sun.

The elongated islands force the vehicles to approach the fuel dispensers in a predetermined way. In general, vehicles have to queue in line in front of one of the refueling positions. Within each fuelling cycle, two vehicles, each on opposite longitudinal sides of the island, can be refueled.

FIG. 1B shows a schematic plan view of an actual fuel station 300 along a motorway. The station is designed for a relatively high throughput of fuel and vehicles. Therefore, the station includes a relatively large number of parallel islands 12, each having right side and left side refueling positions 16, 18 respectively. As an example, the station is provided with a total of 28 refueling positions P1 to P28, mainly positioned next to each other. Refueling positions P1 to P24 are designed for cars (positions P2 to P24 are shown), whereas positions P25 to P28 (not shown) are designed for trucks. Also indicated is shop building 206 and pavement 222.

The table in FIG. 1C shows the results of an analysis of the fuel station 300 of FIG. 1B. The x-axis indicates the time t during a day indicated in hours, and the y-axis indicates refueling positions P1 to P28. The numbers 302 indicate the average number of customers at a certain refueling position at a particular hour. Row 304 indicates the average number of customers at a particular hour for the entire fuel station, whereas column 306 indicates the average number of customers at a particular refueling position during one day. In the example of FIG. 1C, the number of total customers during one day 308 is for instance 1846.

The data of the analysis as expressed in FIG. 1C show that customers preferably use the refueling positions in front of, or at least closest to the shop building 206. The fuel dispensers of positions P11 to P21 provide more fuel than their respective design capacities, i.e. the amount of fuel these dispensers were intended to provide on average. The amount of fuel dispensed at one of these positions may exceed the design capacity of the respective fuel dispenser for instance more than 50% to 80%, even up to 100%. In addition, customers tend to prefer right hand fill positions, i.e. the refueling positions 18 on the left side of the corresponding dispenser. The latter may be related to the position of the filler cap, i.e. the cap of the fuel tank of a vehicle, which may typically be positioned on the right side of a vehicle. In addition, refueling positions more remote from the shop building 206, such as positions P1 to P10 and P22-P24 located nearer towards the left and right ends of the fuel station, were used less often and provided an amount of fuel (far) below their respective design capacity.

Although the fuel station 300 described above performs fine, the analysis indicates that increasing the number of refueling positions side-by-side does only increase the efficiency of the station up to a certain threshold. For instance, by adding one more additional fuel dispenser, the increase of the total capacity of the fuel station 300 will be less than the design capacity of the additional dispenser. This limited additional capacity will have to justify the costs of an additional dispenser and corresponding equipment.

Another configuration of fuel station is shown in FIG. 2A. Herein, additional elongated islands 24 having fuel dispensers 22 are aligned with the islands 12 having fuel dispensers 10. The fuel dispensers are typically arranged in a linear fashion and on separate islands 12, 24, providing linearly aligned right side refueling positions 16, 26 and left side refueling positions 18, 28.

Again, the capacity increase due to additional fuel dispensers 22 is limited. For instance, refueling positions which are arranged one after the other in a linear fashion will limit throughput of vehicles, as queuing vehicles will have to wait until both linearly aligned refueling positions are available before two new vehicles can be refueled. Arrows 30, 32 and 34 in FIG. 2A indicate this with respect to refueling positions 16 and 26. The islands 12, 22 force vehicles to approach each refueling position in a linear fashion, so that it can be annoying or difficult to enter the fuel station, approach the desired fuel dispenser and leave the station. On the other hand, for instance in densely populated urban areas adding islands may be impossible due to lack of space.

FIG. 2B shows a schematic plan view of another typical fuel station 320 along a motorway, having the layout as shown in FIG. 2A. The station 320 comprises for instance about 28 refueling positions P1 to P28.

An analysis similar to the analysis expressed in FIG. 1C indicated that using the layout of FIGS. 2A and 2B, the site 320 had on average provided more than 25% less fuel per refueling position in comparison to the layout shown in FIG. 1A. As a result, fuel station 320 having the layout of linearly aligned refueling positions proved to operate below the design capacity of the station.

U.S. Pat. No. 3,995,769 discloses a fuel-dispensing device, comprising a triangular column-like fuel dispenser arranged on a round island. The triangular fuel dispenser is provided with two fueling nozzles, each mounted at one of the three corners of the triangular column. The triangular column is provided with three indicators, each of which is accommodated in a concerned indicating surface of the triangular column. Thus each column provides three refueling positions. Two round islands, each being provided with one triangular fuel dispenser, may be arranged at a certain distance from each other to allow vehicles to move between islands.

The triangular fuel dispensers of U.S. Pat. No. 3,995,769 however have a number of disadvantages. First of all they are unsafe. Also, additional space for vehicle maneuvering is required making these triangular dispensers less efficient. The triangular dispensers are unsuitable for high-throughput fuel stations, such as stations 300, 320 shown in FIGS. 1B and 2B. Vehicle movements related to the refueling positions of one triangular dispenser column may interfere with the vehicle movements related to the refueling positions of another triangular dispenser column. For instance, it will be unclear to vehicle drivers how to approach the dispensers and subsequently how to depart in an organized manner. These logistical problems may result in vehicles blocking each other, thus restricting the efficiency and capacity of the fuel station. The triangular fuel dispenser columns on separate round islands disclosed in U.S. Pat. No. 3,995,769 are therefore unsuitable for relatively busy fuel stations in view of possible logistical problems.

In view of the above, there is a need to improve the efficiency of a fuel station.

BRIEF SUMMARY OF THE INVENTION

The present invention provides a fuel station, comprising
at least one base structure arranged on a ground surface,
wherein the base structure has a substantially prism-like form having at least three sides, i.e. a first side, a second side and a third side, which together form a generally triangular cross-section;
a first fuel dispensing device arranged on the base structure, comprising an upright column and nozzle means for dispensing fuel, the first fuel dispensing device defining a first refueling position on the first side of the base structure and a second refueling position on the second side of the base structure, the second side being opposite to the first side;
a second fuel dispensing device arranged on the base structure, comprising an upright column and nozzle means for dispensing fuel, the second fuel dispensing device defining a third refueling position on the third side of the base structure.

Together, the second side and the third side of the base structure define a curved path for vehicles. In practice, the curved path of the second and third refueling positions in combination with the first refueling position proves to provide a more intuitive way of refueling. This results for instance in a reduced waiting time at peak time and improves the vehicle flow in the fuel station.

In an embodiment, the angle $\gamma$ between the first side and the second side, and the angle $\delta$ between the first side and the third side are in the range of greater than 0 degrees up to about 45 degrees.

In an embodiment, the present invention provides a fuel station, comprising:
at least two adjacent base structures, each base structure being arranged on a ground surface;
each base structure being provided with a first fuel dispensing device arranged on the respective base structure, the first fuel dispensing device defining a first refueling position on a first side of the base structure and a second refueling position on a second side of the base structure, the second side being opposite to the first side;
each base structure being provided with a second fuel dispensing device arranged on the respective base structure and defining a third refueling position; and
at least one queuing position in front of one of the base structures,
wherein each queuing position is linked to the first refueling position and to the third refueling position of said one of the base structures, and to the second refueling position on an adjacent base structure.

In an embodiment, the fuel station comprises guide means for linking each queuing position to the first refueling position and to the third refueling position of said one of the base structures, and to the second refueling position on an adjacent base structure.

In an embodiment, at least the third refueling position of the second base structure is linked to at least two exit routes. For instance, a first exit route via the second refueling position of said second base structure and a second exit route via the first refueling position of an adjacent base structure.

According to yet another aspect, the present invention provides a method for refueling a vehicle, comprising the steps of:
providing a fuel station comprising at least two adjacent base structures, each base structure being arranged on a ground surface,
wherein each base structure is provided with a first fuel dispensing device arranged on the respective base structure, the first fuel dispensing device defining a first refueling position on a first side of the base structure and a second refueling position on a second side of the base structure, the second side being opposite to the first side;
wherein each base structure is provided with a second fuel dispensing device arranged on the respective base structure and defining a third refueling position;
arranging at least one queuing position for the vehicle, each queuing position being defined in front of one of the base structures; and
linking each queuing position to the first refueling position and to the third refueling position of said one of the base structures, and to the second refueling position on an adjacent base structure.

In an embodiment, the method includes the step of guiding the vehicle from said queuing position to one of the first refueling position and the third refueling position of said one of the base structures, and the second refueling position on an adjacent base structure.

The fuel station of the invention offers waiting vehicles more than one option to proceed to a refueling position. Preferably, for instance two or three refueling positions are linked to each queuing position, wherein said refueling positions are arranged in a non-linear fashion, for instance side-by-side. Whenever one of said refueling positions becomes available, the waiting vehicle can proceed to said available position, without being blocked by vehicles occupying the remaining positions. The efficiency and throughput of the fuel station is thus improved. Linking the third refueling position to at least two exit routes further improves the efficiency and throughput, as the refueled vehicle has two options to leave the site, thus limiting the expected time before the vehicle can depart.

Embodiments of the present invention will now be described by way of example only and with reference to the accompanying non-limiting drawings in which:

BRIEF DESCRIPTION OF THE DRAWINGS

FIG. 1B is a schematic plan view of a prior art fuel station having the layout shown in FIG. 1A;

FIG. 1C is a table including data of an analysis of the fuel station of FIG. 1B;

FIG. 3 is a diagrammatic plan view of a fuel station according to an embodiment of the invention;

FIGS. 4A and 4B show a diagrammatic plan view of a fuel station according to other embodiments of the invention;

FIG. 11A shows a plan view of customer movements in the prior art fuel station of FIG. 8;

FIG. 11B shows a plan view of customer movements in the fuel station of FIG. 9;

FIG. 12A shows a plan view of customer waiting time in the prior art fuel station of FIG. 8; and FIG. 12B shows a plan view of customer waiting time in the fuel station of FIG. 9.

DETAILED DESCRIPTION OF THE INVENTION

Figure 1A:
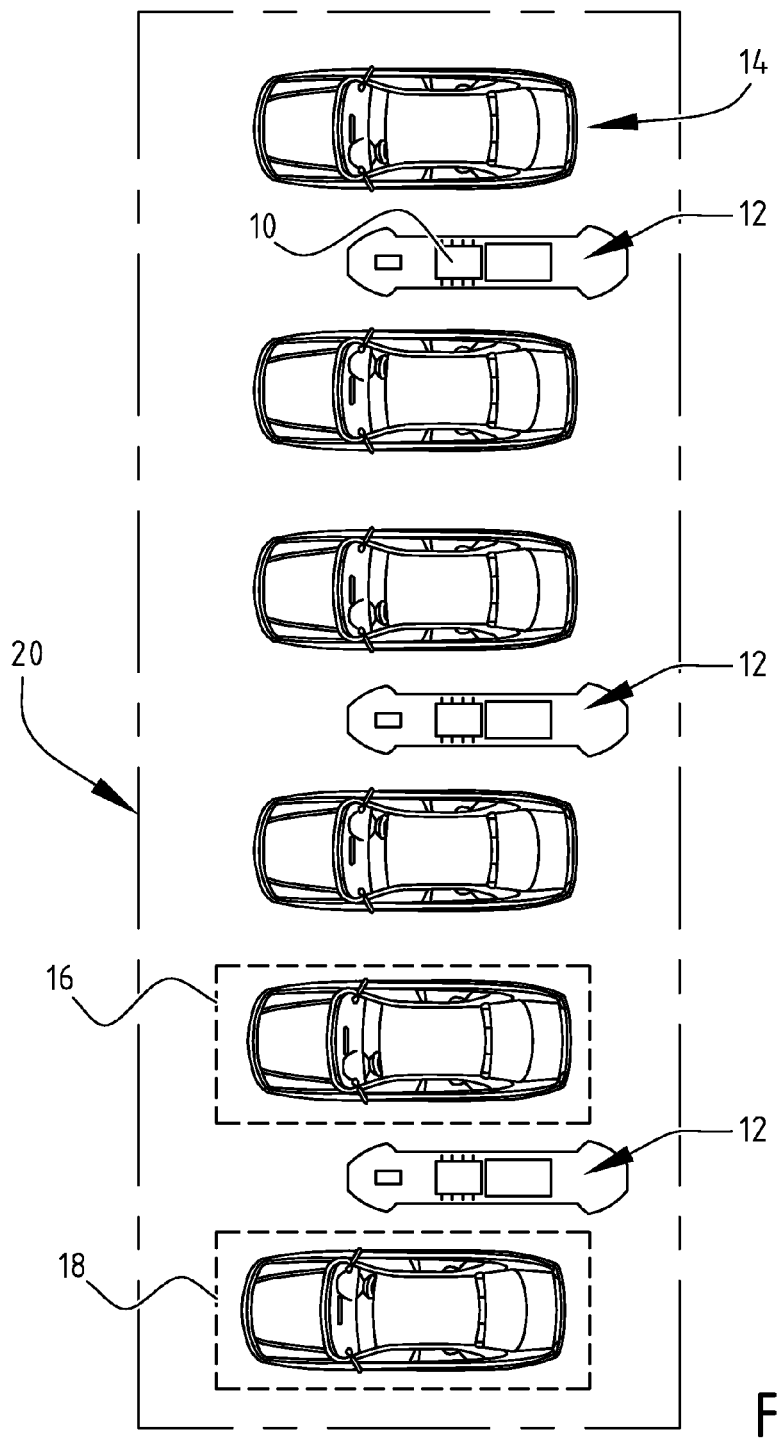
FIG. 1A is a plan view of an exemplary layout of a prior art fuel station.
Figure 2A:
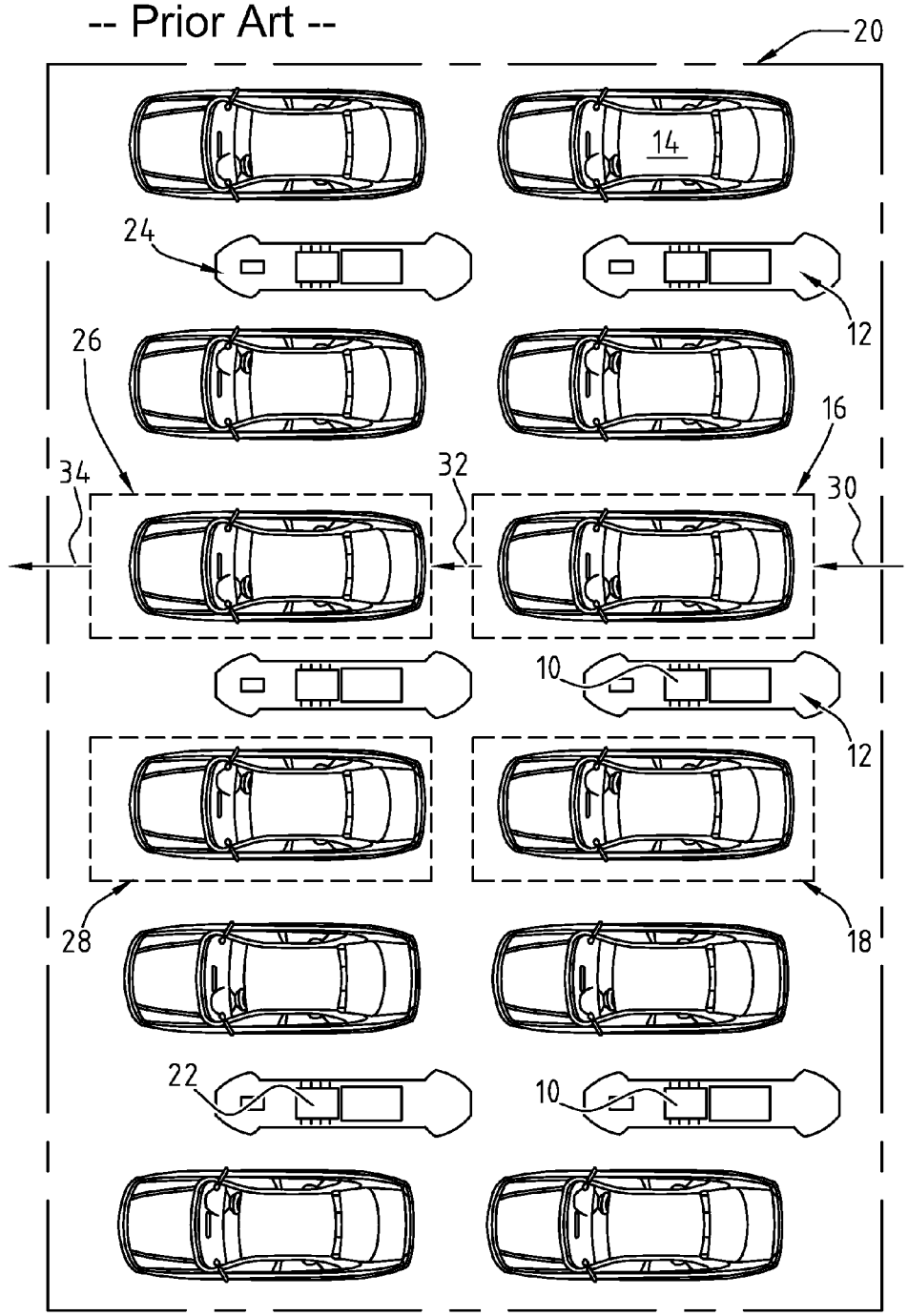
FIG. 2A is a plan view of another exemplary layout of a prior art fuel station.
Figure 2B:
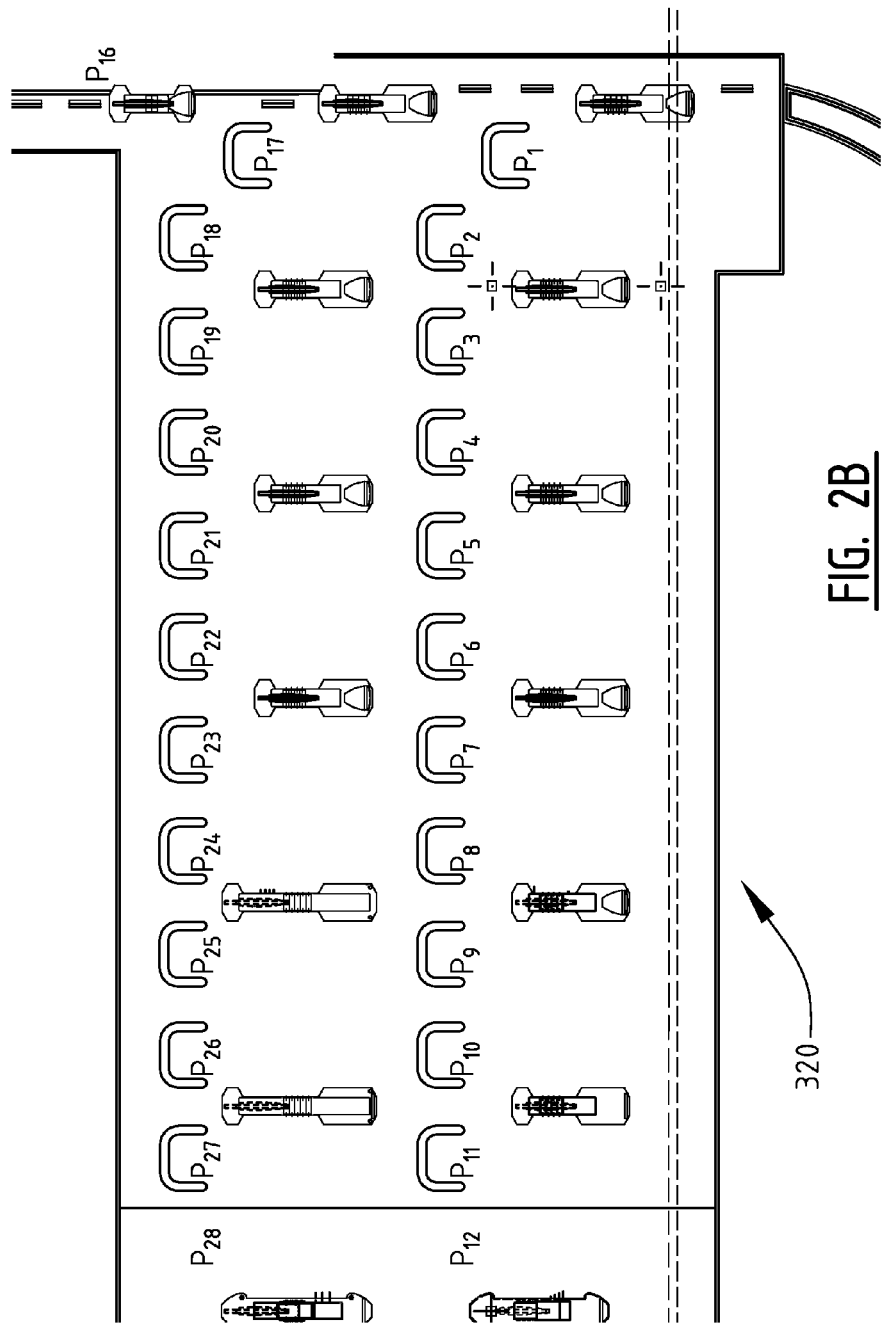
FIG. 2B is a schematic plan view of a prior art fuel station having the layout shown in FIG. 2A.

For the purpose of this description, the same reference numbers used in different Figures represent identical features.

Referring to the drawings, FIG. 3 shows fuel station 400 comprising first fuel dispensers 50 arranged on for instance three islands 52, 54, 56. The fuel dispensers 50 define a first refueling position 58 on a first side 60 of the respective island, and a second refueling position 62 on a second side of the respective island. The fuel dispensers 50 comprise one or more first nozzles 59 on the side of the first refueling position. The fuel dispensers 50 comprise one or more second nozzles 63 on the side of the second refueling position. Vehicles 14 occupy the first and second refueling positions 58, 62. Canopy 70 is arranged to cover the first and second refueling positions. The islands or base structures 52, 54, 56 may be displaced with respect to each other along mid-line 72, which is parallel to the first sides 60. To cover the refueling positions, canopy sides 74, 76 are arranged at an angle α with respect to the mid-line 72.

FIG. 4 shows fuel station 410, wherein the islands 52-56 are provided with a second fuel dispenser 78, which defines a third refueling position 80. The third refueling position borders a third side 82 of the islands. The second fuel dispensers 78 comprise one or more third nozzles 81 on the side of the third refueling position.

The base structures are a pedestal of a substantially triangular horizontal cross section mounted directly on the ground surface as an island for the fuel dispensing devices. One island or base structure may be an n-sided prism, wherein n is an integer of three or more. The first, second and third sides 60, 64 and 82 respectively guide vehicles 14 in three different, intersecting driving directions. The horizontal cross-section of the base structure is generally triangular, i.e. said three sides 60, 64, 82 generally form a triangular shape in cross section. The edges of the base structure may for instance be rounded, flattened, or otherwise altered, resulting in a polygonal horizontal cross-section. Other sides, such as fourth side 84, fifth side 86, and sixth side 88 (FIG. 4), may simplify the passage of vehicles near ends of the first, second and third side.

Figure 5:
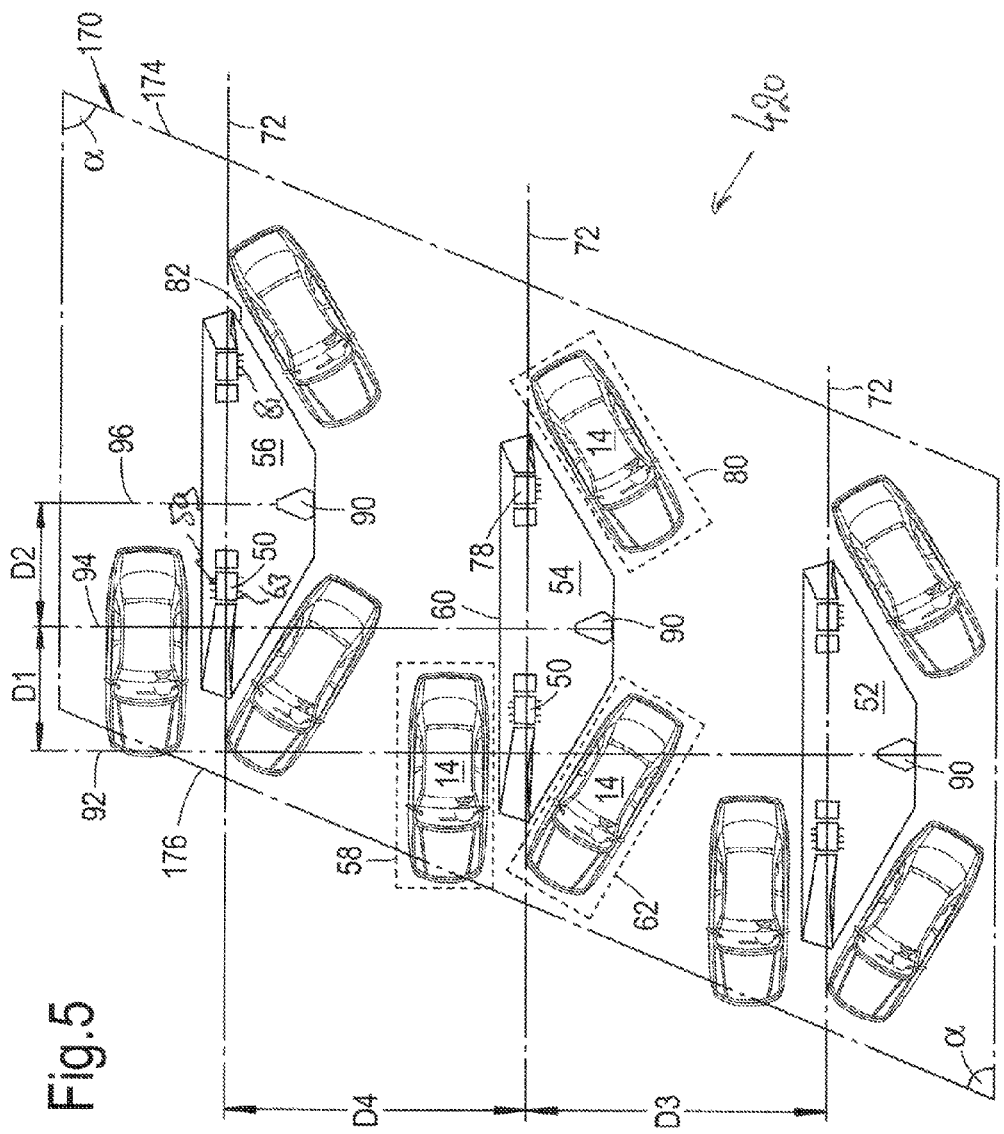
FIG. 5 is a diagrammatic plan view of a fuel station according to an embodiment of the invention.

FIG. 5 shows fuel station 420 wherein a larger canopy 170, having oblique sides 174 and 176, covers the refueling positions 58, 62, 80. The islands are provided with vertical columns 90 which support the canopy. The perpendicular bisectors 92, 94, 96 of islands 52, 54, 56 respectively are displaced over displacement distances D1, D2. D1 and D2 may be equal, and in general will be. The centre lines 72 of the base structures 52-56 are displaced over distances D3 and D4 respectively. D3 and D4 may be equal, and in general will be.

Figure 6:
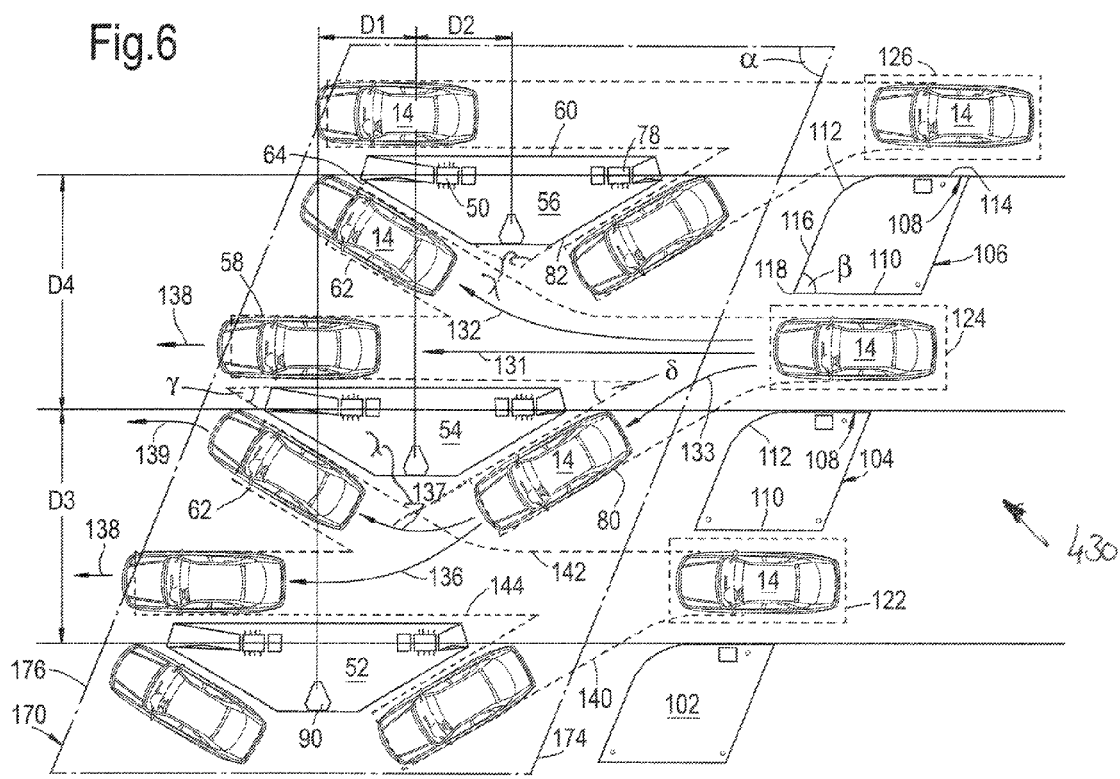
FIG. 6 is a diagrammatic plan view of a fuel station according to another embodiment of the invention.

Fuel station 430 of FIG. 6 comprises guide structures 102, 104, 106. Each guide structure may be provided with a guiding edge 108 and a restricting edge 110. The guiding edge can be provided with a curve 112, wherein a first part 114 extends via the curve to a second part 116 which is connected to the restricting edge at corner 118. The second part 116 and the restricting edge 110 make a mutual angle β. Queuing positions 122, 124, 126, corresponding to respective base structures 52, 54, 56, are defined between the guiding edge and the restricting edge of adjacent guide structures.

Together, the extending corner 118 and the curve 112 provide queuing vehicles 14 a predetermined number of ways to proceed to one of the refueling positions. Arrows 131, 132, 133 indicate routes to proceed to the first, second and third refueling positions 58, 64, 80 respectively. Arrows 136-139 indicate routes via which vehicles continue and subsequently leave the fuel station.

In the embodiments shown in FIGS. 4, 5 and 6, the queuing vehicles in front of islands 52, 54 are provided with three possible routes, indicated by the arrows 131-133 in FIG. 6, to proceed to one of the refueling positions. The vehicle queuing in front of island 56 is provided with two options to proceed, i.e. to the first position 58 of island 56 and to the third position 80 on island 54.

After refueling, vehicles 14 occupying positions 58 and 62 can leave the fuel station as indicated by the arrows 138 and 139 respectively. Vehicles occupying one of the third refueling positions 80 will have two possibilities to proceed after refueling, as indicated by the arrows 136 and 137. The latter vehicles will have to wait until one of the vehicles refueling at one of the respective positions 58 or 62 leaves, and then proceed and exit the fuel station subsequently via the available position. Optionally, the fuel station floor may be provided with additional guide means and markers 140-144 to link queuing positions to corresponding refueling positions and to guide vehicles along the predetermined When refueling a vehicle at a fuel station as described above, the vehicle waits in front of one of the island, preferably at one of the queuing positions 122-126. When one of the refueling positions linked to the position of the queuing vehicles becomes available, said vehicle proceeds along the respective direction indicated by one of the arrows 131-133. After refueling at one of positions 58 and 62, the vehicle leave the fuel station along the direction indicated by arrows 138, 139 respectively. After refueling at one of the third positions 80, the vehicle waits until one of the vehicles refueling at one of the respective positions 58 or 62 leaves, and then proceeds and exits the fuel station subsequently via the available position, i.e. via the directions indicated by arrows 136, 138 or the arrows 137, 139 respectively.

In practice, D1 and D2 may be in the order of 1 to 5 meter, for instance about 3 meter. D3 and D4 may be in the order of 5 to 10 meter, for instance 7.5 meter. The displacements D1-D4 can vary depending on the type of vehicle to which the fuel station attends, such as cars, trucks or lorries. Angle α is smaller than 90 degrees, for instance in the range of 80 to 50 degrees. Angle β is smaller than 90 degrees, for instance in the range of 80 to 30 degrees. Angle β may be substantially equal to angle α.

Figure 7:
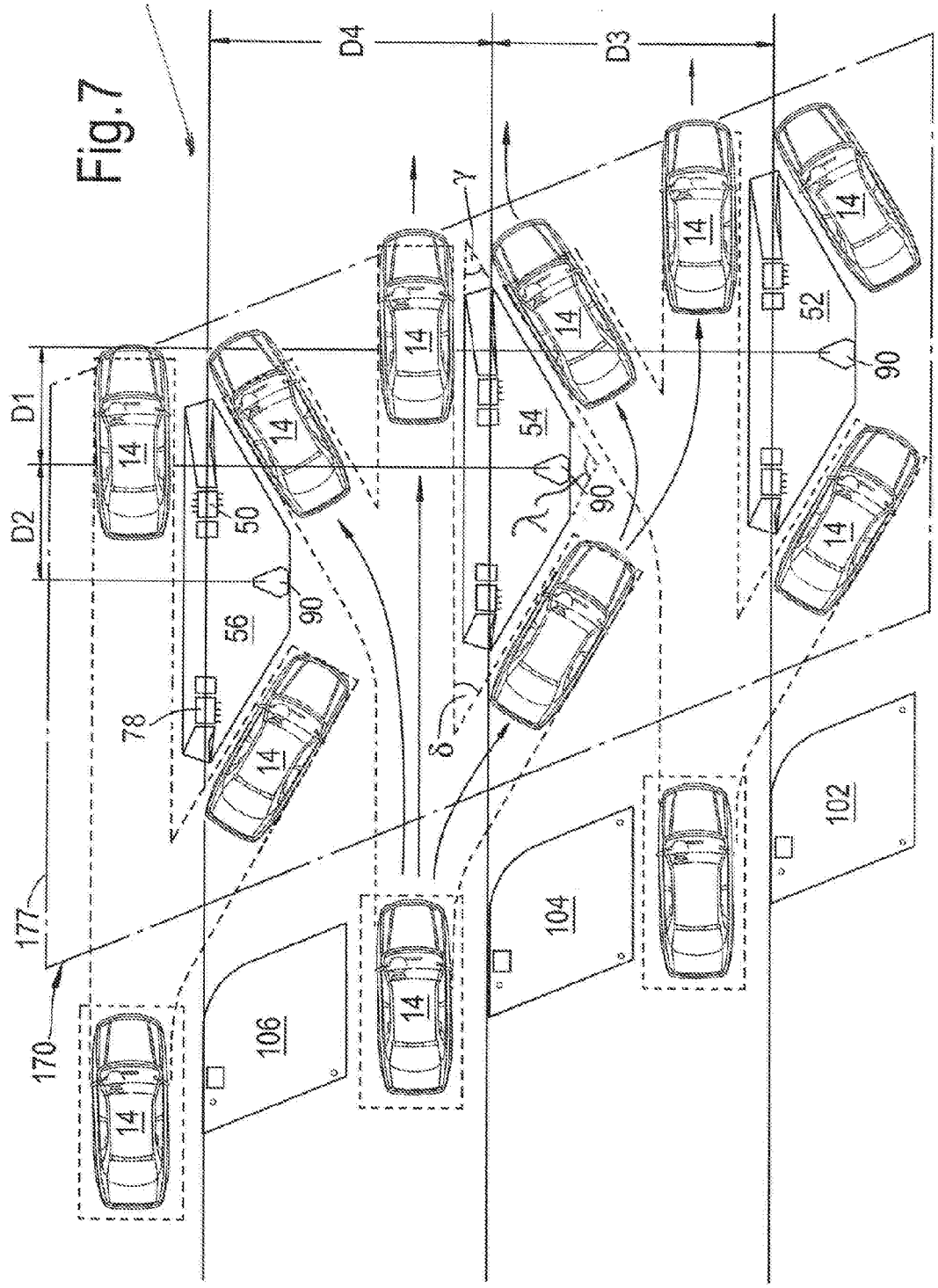
FIG. 7 is a diagrammatic plan view of a fuel station according to yet another embodiment of the invention.
Figure 9:
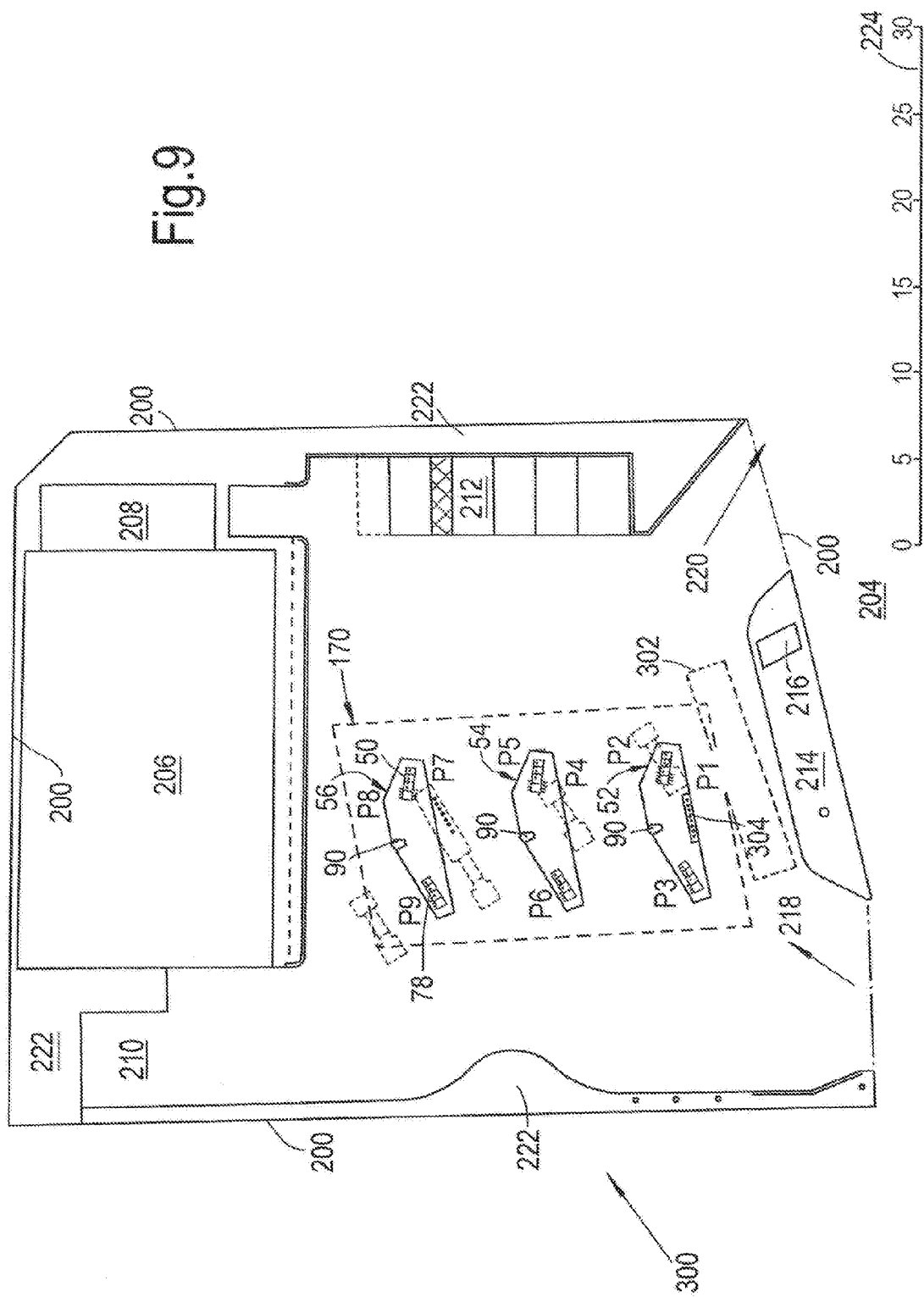
FIG. 9 is a schematic plan view of an embodiment of a fuel station according to the invention, implemented at the site shown in FIG. 8.

In addition to the above, the orientation of the base structures in relation to the site layout and direction of approach may also be varied. Optionally, the orientation of one or more of the fuel dispensers with respect to the corresponding base structure may be adjusted. FIGS. 7 and 9 show exemplary embodiments.

As shown in FIG. 7, fuel station 440 has a reversed entry direction for the vehicles 14. Similarly, the fuel station may be adapted to left hand drive or right hand drive. Also, the first refueling position 58 may be located at the second or aft fuel dispenser 78. However, in a preferred embodiment the first refueling position is located at the first fuel dispenser 50, i.e. on the front side or egress side of the base structure.

The angles γ and δ, i.e. the angles between the first and second side and between the first and third side respectively, can also be varied depending on site specific conditions, such as available space, expected vehicle size, etc. Herein, γ and δ are for instance in the range of greater than 0 degree up to about 45 degrees, for instance about 30 to 35 degrees. The angles γ and δ may be equal, or may be different.

Together, the second side and the third side of the base structure define a curved path for vehicles (FIG. 6, arrow 137). The curved path has a sort of banana shape. The first, second and third sides render the shape of the base structure a blunt triangle, i.e. a non-equilateral triangle. The first side is longer than the second side and the third side. An angle λ (FIGS. 6, 7, 10) between the second and third side is an obtuse angle. The angle λ is for instance larger than or equal to 90 degrees and smaller than 180 degrees. The angle λ is for instance in the range of about 110 to 120 degrees. The curved path indicated by arrow 137 is adapted to the turning circle of a car, which is typically about 10 m or more.

A fuel station according to the present invention thus provides a traffic lane between a pair of adjacent fuelling islands of which at least one island has a profiled elongate side having a profile which is configured to provide the traffic lane with an at least partly curved shape (as indicated by arrow 137 in FIG. 6, and to enhance the flux of traffic as indicated in FIG. 11B). The profiled elongate side may be constituted by the assembly of the second side and the third side. The at least partly curved shape of the traffic lane is configured to steer vehicles in the traffic lane in a curved path though the traffic lane. The curved path may be configured with consideration to the turning circle of the vehicles. Typically, the curved path may form a segment of a circle with a diameter of at least 10 preferable at least 15) meters. As a result the curved path is optimized for cars. At least one fuelling island may have a generally prismatic profile. In the context of the present invention, the generally triangular cross-section of the islands may include such a curved profile. The first side, opposite to the curved profile, may be substantially straight and elongated, as the first side 60 shown in FIG. 10. The base structures typically have a length in the order of the length of two vehicles. The first side thus is substantially straight and has a length substantially in the order of the length of two vehicles. The second and third side each have a length in the order of the length of one vehicle.

The first and second fuel dispenser each comprise fuel nozzles, each related to one of the refueling positions. In an embodiment (FIG. 4B), the first fuel dispensers 50 may comprise two separate columns. I.e. one column relating to the first refueling position and having the first nozzles, and an additional column relating to the second refueling position and having the second fuel nozzles.

The base structures or islands itself may comprise separate parts, or may be arranged on a pedestal or be elevated. The base structure may for instance be arranged on a number of posts.

A practical embodiment is described with reference to FIGS. 8 and 9.

Figure 8:
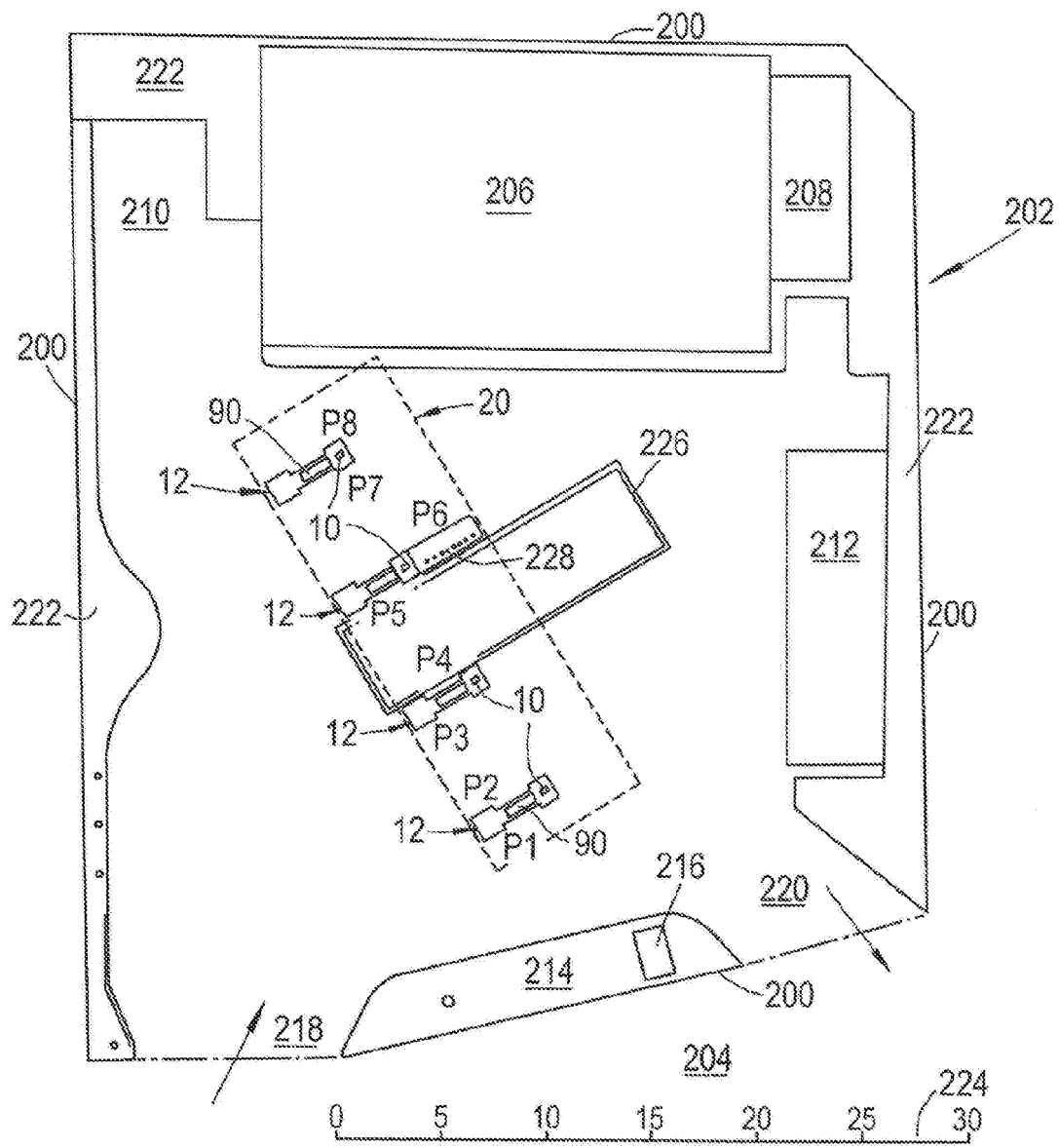
FIG. 8 is a plan view of a prior art fuel station.

FIG. 8 shows the outline 200 of a typical prior art fuel station 202 in an urban area, which is enclosed by adjacent urban structures, such as road 204 and one or more buildings (not shown). The station 202 may comprise one or more of a sales building or shop 206 having a store or cash desk 208, a parking area 210 near the shop, a service station for supplying air and water 212, an entrance structure 214, a sign 216 for displaying for instance a brand name and/or fuel prices, an ingress crossover 218, i.e. an entrance, an egress crossover 220, i.e. an exit, and one or more boundary structures 222, which are for instance provided with architectural structures, pathways and/or landscaping. A scale 224 indicates exemplary dimensions expressed in meters. For a relatively small fuel station in an urban area, the boundary 200 may have a width in the order of 40 to 50 meters, and a length in the order of 50 to 60 meters. However, these sizes are mentioned as example only, and the invention can be applied within the boundaries of smaller or larger fuel stations.

The prior art fuel station 202 shown in FIG. 8 is provided with four elongated base structures 12, which are arranged in parallel. Fuel dispensers 10 are arranged on the base structures and provide for eight refueling positions P1 to P8 adjacent to the respective fuel dispensers. A rectangular canopy 20 covers the base structures and the refueling positions. A tanker stand 226 covers the refueling positions P4 and P5. The tanker stand is an area large enough for a tanker, i.e. a truck for transporting fuel and for refilling storage tanks of the fuel station. When positioned at the tanker stand, the tanker can supply one or more fuels to the filling connections 228, which are each connected to a corresponding underground storage tank (not shown).

FIG. 9 shows fuel station 300 according to the present invention, which is implemented within the boundary 200. Many of the existing structures have been maintained, and are indicated with the same reference numerals as shown in FIG. 8. The outlines of the previous base structures 12 and the tanker stand 226 are indicated in dotted lines. In the fuel station 300, said base structures 12 are replaced with polygonal base structures 52-56, providing for refueling positions P1-P9. Columns 90 supports the canopy 170, which covers the refueling positions and the base structures. Tanker stand 302 is located adjacent to the entrance structure 214, for supplying fuel to the filling connections 304 which are arranged on the first base structure 52.

Although three base structures 52-56 have replaced four base structures 12, wherein the number of refueling positions increases from eight to nine, any number of base structures may be used according to the present invention, to enable to use the given space in the most efficient way.

Queuing positions and guide structures may be implied by the form of the base structures and the arrangement thereof with respect to the entrance and exit of the fuel station. If required, said queuing positions and or guiding structures can be painted or otherwise arranged in front of the base structures to control or restrict vehicle movements.

The first side 60 of the base structures may be angled with respect to side 177 of the canopy to enable the most efficient entry angle to the refueling positions.

Figure 10:
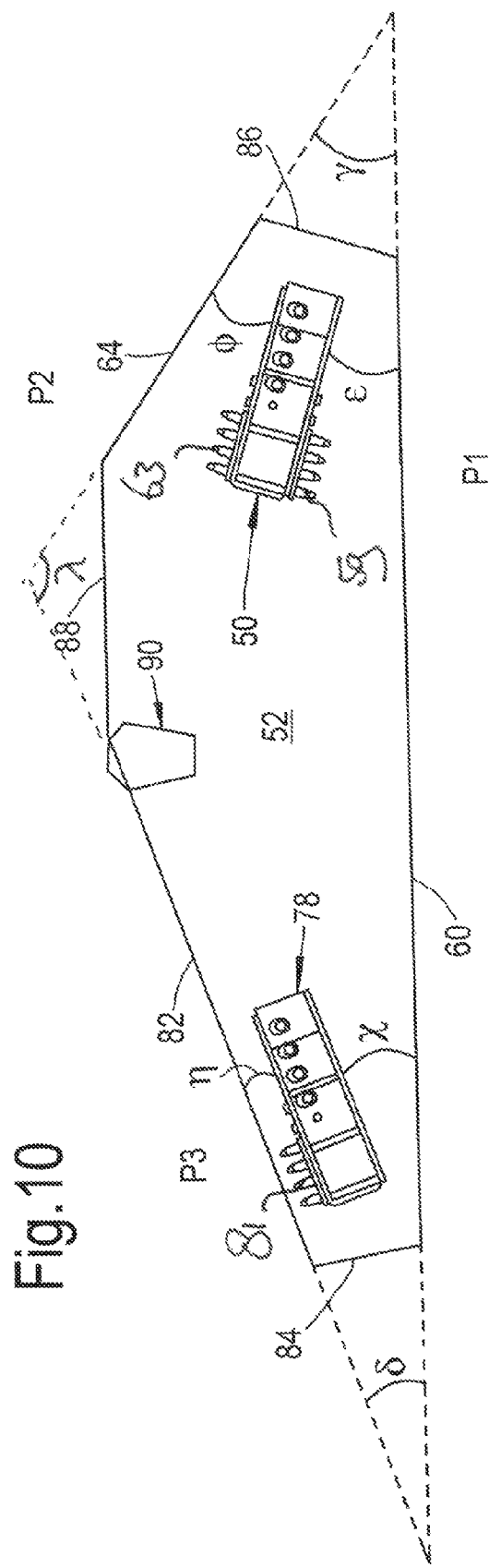
FIG. 10 shows a plan view of one base structure of the fuel station of FIG. 9.
Figure 19B:
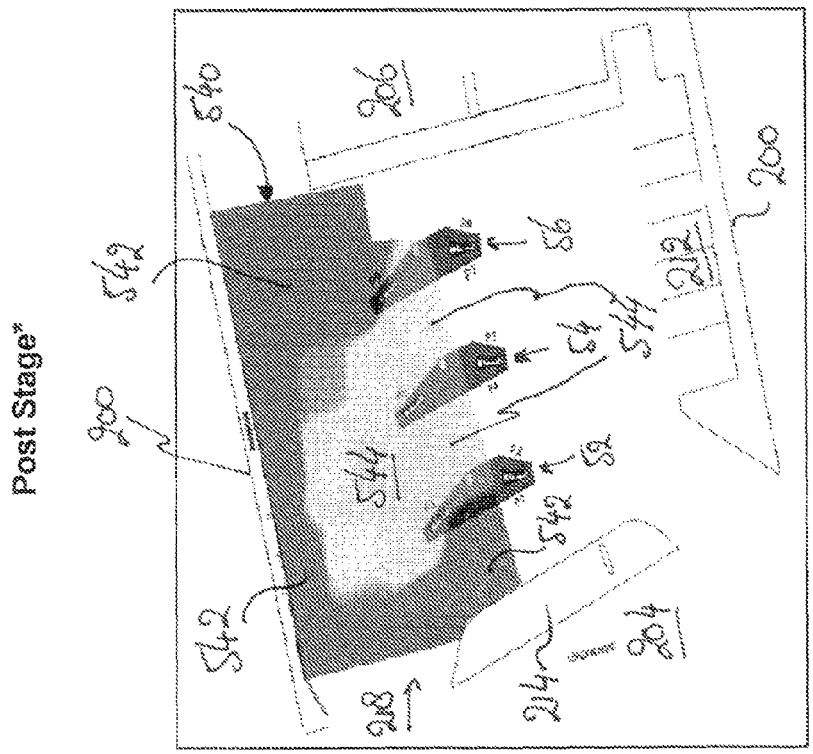
Figure 19A:
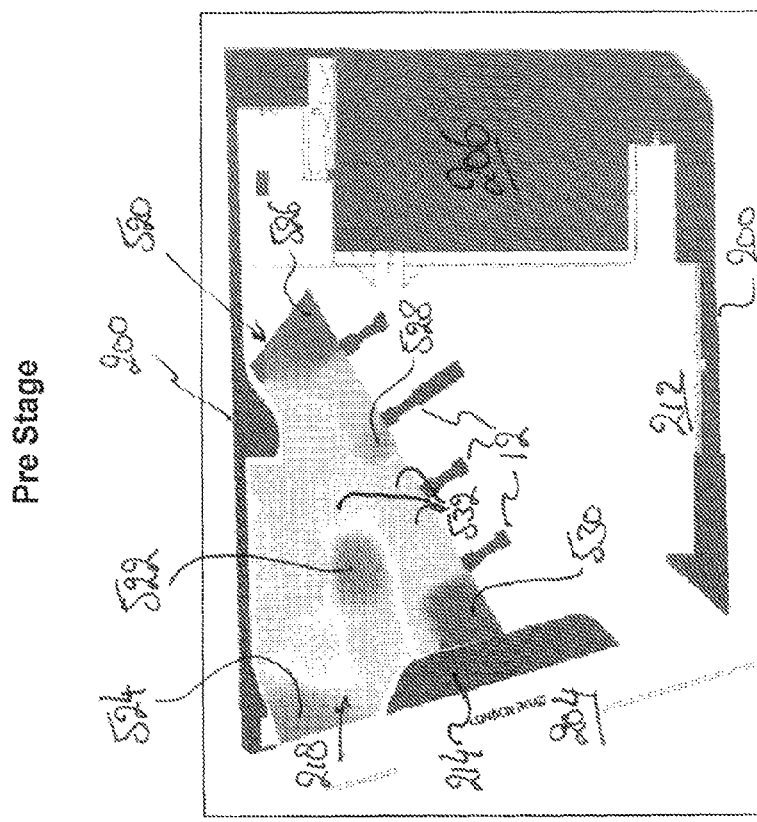

Each base structure, one of which is shown in detail in FIG. 10, comprises first side 60, second side 64 and third side 82. Together, said sides substantially constitute a triangle when viewed from above. At the ends of each said side, said triangle may be rounded off or cut off. For instance, sides 84, 86, 88 form base structure 52 into a polygonal prism.

The orientation of the fuel dispensers upon the base structure with respect to the first side and the respective second or third side may be varied to match an expected approach path of vehicles or to further improve the forecourt efficiency. Herein, angles $\epsilon$, $\phi$ between the first fuel dispenser 50 and the first and second sides 60, 64 respectively and/or angles $\chi$, $\eta$ between the second fuel dispenser 78 and the first and third sides 60, 82 respectively may be varied. Said angles can be adjusted between a minimum of 0 degrees up to a maximum in the order of $\gamma$ or $\delta$ respectively.

The success of the fuel station 300 shown in FIG. 9 can be expressed using a number of metrics, including:
 i) Waiting time to refuel; and
 ii) Vehicle flow.

In order to measure and quantify these metrics, customers of the fuel station were observed, both in the prior art layout (FIG. 8) and in the layout according to the invention (FIG. 9). During the analysis, a camera picked up vehicles as they entered the forecourt via the entrance 218, captured their forecourt journey until the point of exit as well as customer's queuing and/or paying in the store. Herein, forecourt indicates the area of the fuel station in front of and including the refueling positions.

The vehicle flow (FIGS. 11A, 11B) was determined based on a total sample of vehicles during a specific period of time. For the pre stage (FIG. 11A), the original base size was used, i.e. all the vehicle movements were included. The thickness of the line highlights the volume of vehicles taking each route, i.e. the thicker the line the more vehicles took that path. The percentages next to the pumps are the number of vehicles visiting each pump (vehicles can have visited more than one pump). In the post stage (FIG. 11B), dotted lines were added to the maps to represent where vehicles reversed on the forecourt.

The heat map (FIGS. 12A, 12B) was based on a total sample of vehicles during a specific period of time. For the pre stage (FIG. 12A), the original base size was used, i.e. all the vehicle movements were included. Post stage figures (FIG. 12B) were recalculated based on the pre stage base and weighted using fuel transaction sales data to provide an accurate comparison.

Manual counts are made of where vehicles stopped on the forecourt during their journey. A vehicle can stop at several different places on the forecourt and will be counted at each point. The data is used to create the heat map showing hot and cold spots. The warmer the color the more vehicles stopped at the point, i.e. red indicates areas where more vehicle stop and blue denotes areas where the number of vehicles stopping is less. Post stage data (FIG. 12B) has been recalculated to bring it in line with the pre stage data. The post stage data were weighed to bring these in line with the pre stage data and make the data comparable, which enabled to see that the picture in the post stage (FIG. 12B) is more favorable.

FIG. 11A shows prior art vehicle flows 500 and an indication of exemplary percentages of the total flow 502 at each of the refueling positions P1-P8. A larger vehicle flow is indicated using a wider line.

FIG. 11B shows vehicle flows 510 and an indication of exemplary percentages of the total flow 512 at each of the refueling positions P1-P9 of the layout of the invention. A larger vehicle flow is indicated using a wider line. The flow of vehicles spread out more evenly across the forecourt and the available refueling positions in the layout according to the present invention (FIG. 11B).

Figure 1C:
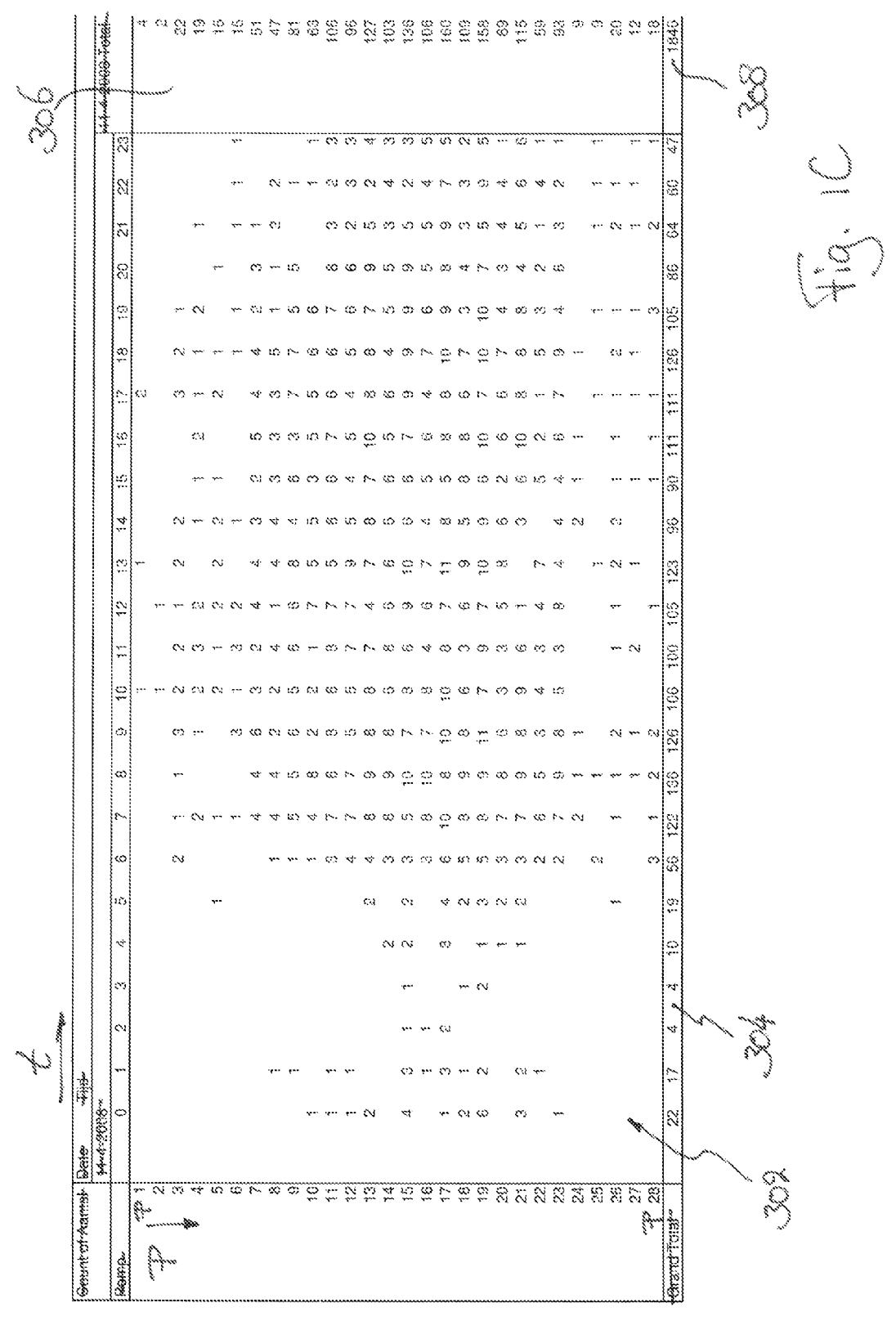

FIG. 12A shows prior art vehicle waiting times 520. A red color indicated a relatively long waiting time, whereas blue colors indicated shorter waiting times and green indicated average waiting times. The prior art layout of FIG. 12A provided two red hotspots 522, 524, where customers waited longer than average before proceeding towards one of the refueling positions. Waiting herein may for instance indicate hesitation or queuing, which both indicate a suboptimal vehicle flow at uneven speeds. The analysis also indicated blue cold spots 526, 528, 530, where waiting times were less than average. A green area 532 of average waiting time covered refueling positions P3 and P4 and a relatively small part of the forecourt only. Please note that the pattern of the cold spots 526-530 (as shown in FIG. 12A for an urban fuel station) corresponds to the results of the analysis as described with respect to FIG. 1C (relating to a motorway fuel station).

FIG. 12B shows vehicle waiting times 540 at the forecourt having the layout of the invention. The pattern of vehicle waiting times indicated a blue area 542 (relatively short waiting time) along the edges of the fuel station, and a green area 544 (average waiting time) in the middle. The green area 544 covers most of the refueling positions, indicating that customers were evenly distributed across the forecourt and proceeded towards one of the refueling positions without hesitating or queuing.

Queuing time at the forecourt during peak time diminished from 2:19 minutes on average to about 1 minute on average, a decrease of waiting time in the order of 50% or more. Herein, peak time includes one or more of 7.00 am to 8.30 am, 11.30 am to 1.30 pm and 4.30 pm-7.00 pm.

The total flow rate, i.e. the average of the total number of vehicles refueling at the fuel station during a day increase from about 60 to about 90 or more on average, an increase of about 50% or more. Taking into account the additional refueling position P9 (FIG. 9), the weighed increase in flow was still more than 25%.

Given the results of the analysis as described above, the layout according to the present invention provides a number of advantages with respect to prior art layouts. For instance, the vehicle flow is more intuitive and safe. The layout of the invention diminishes confusion and improves certainty in terms of directions and access to the pumps. Site navigation proves to be easier and clearer. Probably as a result, the average speed of a visit to the fuel station increases. The average waiting time is reduced, wherein the reduction is most dramatic during peak hours. Queuing at the forecourt is reduced, obviating any hotspots. The flow of vehicles is spread out more evenly, resulting in less congestion (no hot spots) and a higher total capacity of the fuel station.

In addition, interviews have indicated that customers find it easier to navigate (i.e. from driving to the pump to driving away) and that the amount of space to maneuver around has become better for most customers. For instance, customers have told the Applicant that:
 "The pump layout is much better. You can maneuver easily. There is more space between cars";
 "More space between the pumps. No more lengthy queues! More user-friendly forecourt";
 "It is easier and quicker to buy fuel. Layout and space have improved. We had to queue endlessly before the refit. Now it is a lot easier!".

The forecourt layout according to the present invention has successfully improved the speed and ease with which customers can refuel. Specifically, the impacts of the layout are:
 Improving the flow in the forecourt;
 Improving ease of navigation;
 Facilitating a higher capacity of traffic;

Reducing the waiting time at the peak period;
Improving the speed of a visit, e.g. decreasing the time of the visit;
Maintaining or enhancing a sense of safety;
Improving the customer's overall experience.

The person skilled in the art will understand that the present invention can be carried out in many various ways without departing from the scope of the appended claims. Features of respective embodiments may for instance be combined.

What is claimed is:

1. A fuel station, comprising:
    at least one base structure arranged on a ground surface, wherein the base structure has a substantially prism form having at least three sides, including a first side, a second side and a third side, which together form a generally triangular cross-section;
    a first fuel dispensing device arranged on the base structure, comprising an upright column and at least one nozzle for dispensing fuel, the first fuel dispensing device defining a first refueling position on the first side of the base structure and a second refueling position on the second side of the base structure, the second side being opposite to the first side; and
    a second fuel dispensing device arranged on the base structure, comprising an upright column and at least one nozzle for dispensing fuel, the second fuel dispensing device defining a third refueling position on the third side of the base structure.

2. The fuel station of claim 1,
    wherein $\gamma$ is the angle between the first side and the second side;
    wherein $\beta$ is the angle between the first side and the third side; and
    wherein $\gamma$ and $\delta$ are in the range of greater than 0 degrees up to about 45 degrees.

3. The fuel station of claim 2, wherein either $\gamma$ or $\delta$, or both, are in the range of from about 30 to 35 degrees.

4. The fuel station of claim 1, wherein the first side, the second side and the third side of the at least three sides guide vehicles in a first, a second and a third driving direction respectively, wherein the first, second and third driving directions intersect each other.

5. The fuel station of claim 1, wherein the first fuel dispensing device is arranged on a front end of the respective base structure which is remote from a corresponding queuing position, and wherein the second fuel dispensing device is arranged at an aft end of said respective base structure which is near to said corresponding queuing position.

6. The fuel station of claim 1, comprising at least two adjacent base structures, each base structure being arranged on the ground surface.

7. The fuel station of claim 6, comprising at least one queuing position in front of one of the base structures, wherein each queuing position is linked to the first refueling position and to the third refueling position of said one of the base structures, and to the second refueling position on an adjacent base structure.

8. The fuel station of claim 6,
    wherein at least the third refueling position of the second base structure is linked to at least two exit routes, including a first exit route via the second refueling position of said second base structure and a second exit route via the first refueling position of an adjacent base structure.

9. The fuel station of claim 6, wherein each base structure is displaced along the direction of the first side with respect to each adjacent base structure.

10. The fuel station of claim 1, comprising at least one guide structure, each guide structure being aligned with one of said base structures and having a guiding edge for determining a respective queuing position for vehicles and for linking said queuing position to one or more of the refueling positions.

11. The fuel station of claim 10, comprising two or more adjacent guide structures, each guide structure comprising a restricting edge for restricting movement of a waiting vehicle, at least one of the queuing positions being defined between the guiding edge of a first guide structure and the restricting edge of a second guide structure.

12. The fuel station of claim 1, wherein the first fuel dispending device or the second fuel dispensing device or both comprise a head, an upright column connecting said head to said base structure, at least one indicator in said head for indicating the amount of fuel dispensed with each respective indicator, each indicator being located on one of two opposite sides on said head, at least one nozzle mounted on said head or on said upright column for dispensing fuel therethrough, and at least one transfer conduit in said upright column for transferring fuel through the base structure to said at least one nozzle.

13. The fuel station of claim 12, each nozzle of the at least one nozzle being coupled to a different transfer conduit, wherein each transfer conduit is coupled to a different fuel storage tank.

14. A method for refueling a vehicle, comprising the steps of:
    providing a fuel station comprising at least two adjacent base structures, each base structure being arranged on a ground surface,
    wherein each base structure is provided with a first fuel dispensing device arranged on the respective base structure, the first fuel dispensing device defining a first refueling position on a first side of the base structure and a second refueling position on a second side of the base structure, the second side being opposite to the first side;
    wherein each base structure is provided with a second fuel dispensing device arranged on the respective base structure and defining a third refueling position;
    arranging at least one queuing position for the vehicle, each queuing position being defined in front of one of the base structures; and
    linking each queuing position to the first refueling position and to the third refueling position of said one of the base structures, and to the second refueling position on an adjacent base structure.

15. The method of claim 14, comprising the step of:
    guiding the vehicle from said queuing position to one of the first refueling position and the third refueling position of said one of the base structures, and the second refueling position on an adjacent base structure.

* * * * *